Feb. 25, 1958  M. R. ROWE ET AL  2,824,426
TEMPERATURE MODIFIED SPEED SWITCH MECHANISM
Filed March 29, 1955
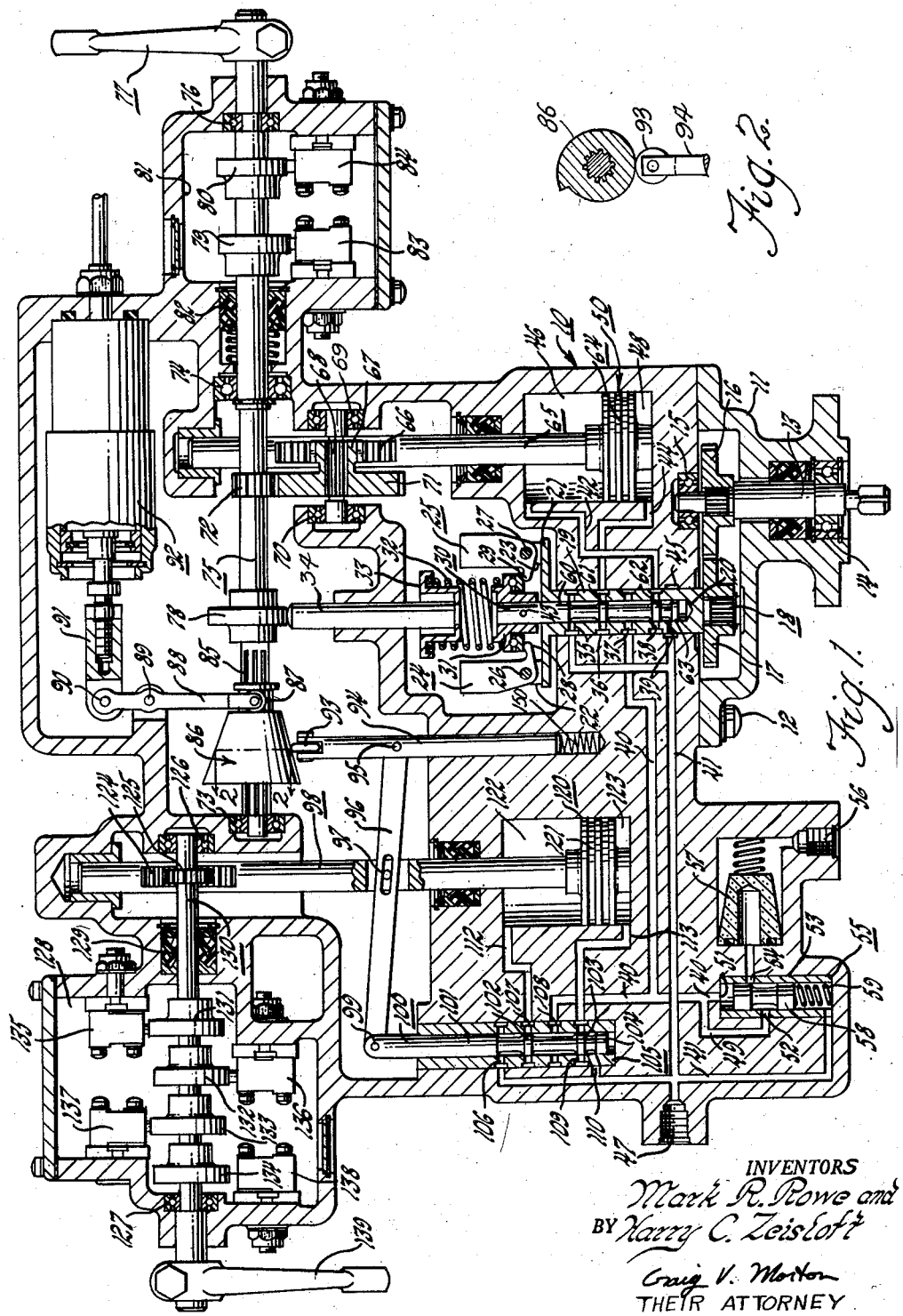
INVENTORS
Mark R. Rowe and
BY Harry C. Zeisloft
Craig V. Morton
THEIR ATTORNEY

United States Patent Office 2,824,426
Patented Feb. 25, 1958

2,824,426

TEMPERATURE MODIFIED SPEED SWITCH MECHANISM

Mark R. Rowe and Harry C. Zeisloft, Rochester, N. Y., assignors to General Motors Corporation, Detroit, Mich., a corporation of Delaware Application March 29, 1955, Serial No. 497,577

4 Claims. (Cl. 60—97)

This invention pertains to switch actuating mechanism, and particularly to speed responsive, temperature modified mechanism for actuating switches.

Some turbo jet engine functions are directly related to the speed of operation, while other functions are related to engine speed modified by the temperature of inlet air at the compressor. These functions may be controlled by an electrical device under the control of a switch. The control functions may include: positioning of the compressor inlet guide vanes; adjusting tail gate nozzle area; controlling energization of the ignition circuit; controlling afterburner operation; and controlling compressor operation to prevent engine surging. The present invention relates to mechanism for sensing actual engine speed to actuate one output member, and means for sensing actual speed modified by temperature, or corrected speed, for actuating a second output member. Accordingly, among our objects are the provision of means for sensing actual engine speed and positioning an output member in accordance therewith; and the further provision of means for positioning a second output member in accordance with corrected engine speed.

The aforementioned and other objects are accomplished in the present invention by incorporating centrifugally responsive means for sensing actual engine speed and modifying the output thereof in accordance with compressor inlet air temperature. Specifically, the mechanism includes centrifugally responsive, spring opposed means which are driven at a speed proportional to actual engine speed. The centrifugally responsive means are carried by a shaft having an axial recess within which a reciprocable pilot valve is disposed. The pilot valve controls the application of fluid under pressure to a double-acting servo-motor. The servo-motor, in turn, positions a first shaft, constituting one output member, in accordance with actual engine speed. In addition, this shaft resets the governor spring through a force feedback arrangement whereby the servo-motor piston will have a predetermined position for each and every engine speed level, and the relationship therebetween will be a substantially linear function.

The first shaft carries a three-dimensional cam, the base circle of which may be varied in accordance with inlet air temperature as sensed by a thermostat. The three-dimensional cam is supported for axial movement relative to the first shaft while constrained for rotation therewith, and actuates a second pilot valve. The second pilot valve controls the application of fluid under pressure to a second double-acting servo-motor, which controls the position of a second shaft, or output member, in accordance with corrected engine speed. The second pilot valve also has a follow-up connection with the second servo-motor piston for resetting the second pilot valve when the movement called for by the pilot valve has been accomplished by the second servo-motor piston. Both output members actuate a plurality of switches through cams, and in addition, each output member positions a lever constituting a power take-off.

Further objects and advantages of the present invention will be apparent from the following description, reference being had to the accompanying drawing wherein a preferred embodiment of the present invention is clearly shown.

In the drawing:

Fig. 1 is a composite view of the mechanism, partly in section and partly in elevation.

Fig. 2 is a fragmentary view, partly in section and partly in elevation, taken along line 2—2 of Fig. 1.

The mechanism is disposed within a housing generally designated by the numeral 10 to which a gear box housing 11 is connected by means of bolts 12. A stub shaft 13 is rotatably supported at one end by a ball bearing assembly 14 within the housing 11, the other end of the shaft 13 being rotatably supported by ball bearing assembly 15 carried by housing 10. The shaft 13 is driven at a speed proportional to the speed of an engine to which the mechanism disclosed herein constitutes an accessory. Spur gear 16 is drivingly connected with the shaft 13, and meshes with a spur gear 17 that is drivingly connected to a shaft 18. The shaft 18 is rotatably journaled in a bore 19 of the housing 10, and is formed with a centarlly located, axial recess 20.

The shaft 18 has a radially extending flange 21 with a pair of upstanding lugs 22 and 23, to which a pair of flyweights 24 and 25, respectively, are pivoted at 26 and 27. Thus, upon rotation of the stub shaft 13, rotation will be imparted to the shaft 18 and the flyweights 24 and 25. A reciprocable pilot valve plunger 30 is disposed within the axial recess 20, the upper end of the plunger 30 supporting a ball bearing assembly 31, the lower race of which abuts projections 28 and 29 of flyweights 24 and 25, respectively. The ball bearing assembly 31 also constitutes a seat for one end of a compression spring 32, the other end of the spring 32 engaging a seat 33 attached to a reciprocable rod 34. The spring 32 opposes outward movement of the flyweights 24 and 25 under the urge of centrifugal force whereby the pilot valve plunger 30 will remain in a neutral position, as shown in the drawing, when the opposed forces are in equilibrium, and will be displaced from the neutral position when the opposed forces are not in equilibrium.

The shaft, or valve bore, 20 is formed with a plurality of spaced ports 35, 36, 37, 38 and 39, ports 35 through 38 communicating with complementary annular grooves in the external periphery of the shaft 19. Port 37 is connected to a pressure supply passage 40 of the housing, while ports 35 and 39 are connected to a drain passage 41 in the housing. Ports 36 and 38 are connected to control passages 44 and 42, respectively, the passages 42 and 44 communicating with opposed chambers 46 and 48, respectively, of a servo-motor designated generally by the numeral 50.

The upper race of ball bearing assembly 31 is pinned at 43 to the plunger 30 and, hence, is constrained for movement therewith. The port 39 in the shaft 18 communicates with an annular groove 45 in the housing 10. The drain passage 41 connects with a drain port 47, while the pressure passage 40 connects with a branch passage 49.

Passages 40 and 49 communicate with ports 51 and 52, respectively, of a pressure regulator valve designated generally by the numeral 55. The pressure regulator valve 55 includes an open ended sleeve 53 having an inlet port 54, which communicates with a pressure inlet port 56 of the housing through a filter 57. A reciprocable, two-landed plunger 58 is disposed within the sleeve 53 and urged upwardly, as viewed in the drawing, by a spring 59. Upward movement of the plunger 58 under the urge of spring 59 is opposed by the pressure in passage 40 acting on the upper end of plunger 58 through the port 51. In this manner, the plunger 58 throttles the flow of fluid under pressure through inlet port 54 and limits the potential of the pressure in pressure passage 40 to a safe value.

The plunger 30 includes axially spaced lands 60, 61, 62 and 63, lands 61 and 63 coacting with control ports 36 and 38, respectively. Upon an increase in the angular velocity of shaft 18, the flyweights 24 and 25 will move outwardly, thereby raising the pilot valve plunger 30 so as to interconnect supply port 37 with control port 36 while control port 38 is connected to drain. Conversely, upon a decrease in the angular velocity of shaft 18, the spring 32 will overcome the thrust of the flyweights and urge the pilot valve plunger 30 downwardly, thereby connecting port 36 to drain and connecting port 38 to the pressure supply.

The servo-motor 50 includes a cylinder formed within the housing 10 and including chambers 46 and 48, which are separated by a reciprocable piston 64 having a rod 65 with a rack portion 66 thereon. The rack engages a spur gear 67 splinedly connected to a shaft 68, which is rotatably journaled by ball bearing assemblies 69 and 70. The spur gear 67 is integral with a second spur gear 71, which meshes with a spur gear 72 attached to a first shaft, or output member, 75. The shaft 75 is rotatably supported by spaced ball bearing assemblies 73, 74 and 76 and projects through a wall of the housing 10 and has attached thereto a first output lever 77. The shaft 75 also has rigidly attached thereto a reset cam 78 and a pair of actual speed cams 79 and 80. The cams 79 and 80 are disposed within a chamber 81 of the housing, which is sealed from the hydraulic circuit at 82, the cams being operably associated with microswitches 83 and 84, as depicted in the drawing.

The reset cam 78 is engaged by the follower rod 34 and constitutes a force feedback, or reset mechanism, for the speed sensing mechanism including the spring 32 and the flyweights 24 and 25, as well as the pilot valve plunger 30. That is, for each and every vertical position of the plunger 30 with respect to the shaft 18, the piston 64 of the servo-motor 50 will have a corresponding position, and the relationship therebetween will be a substantially linear function.

The shaft 75 is formed with a longitudinally straight splined portion 85 upon which a three-dimensional cam 86 is supported for axial movement relative to the shaft 75, although constrained for rotation therewith. The three-dimensional cam 86 is formed with an integral yoke portion 87, which receives one end of a lever 88 having intermediate pivot 89 to the housing 10. The other end of the lever 88 is pivotally connected at 90 to a reciprocable rod 91 positioned by a thermostat 92, which is responsive to the temperature of inlet air at the compressor. Upon an increase in the inlet air temperature the thermostat 92 will move the rod 91 to the left, thereby imparting counterclockwise movement to the lever 88 about the pivot point 89 so as to move the three-dimensional cam 86 to the right, as viewed in the drawing, thereby increasing the diameter of its base circle. Conversely, upon a decrease in the inlet air temperature, the thermostat 92 will move the rod 91 to the right whereby the cam 86 will be moved to the left, as viewed in the drawing.

The three-dimensional cam 86 is engaged by a follower 93 carried by a reciprocable rod 94. The rod 94 may be biased upwardly so as to maintain cam follower 93 in engagement with the cam 86, as by means of a spring 150. The rod 94 is pivoted at 95 to one end of a lever 96 having an intermediate fulcrum 97 to piston rod 98. The other end of the rod 96 is pivotally connected at 99 to a second pilot valve plunger 100. The pilot valve plunger 100 includes spaced lands 101, 102, 103 and 104, and is disposed for reciprocable movement in a stationary valve sleeve 105. The valve sleeve 105 is formed with axially spaced ports 106, 107, 108, 109 and 110.

The piston rod 98 constitutes part of a second servo-motor generally designated by the numeral 120, which servo-motor includes a piston 121 disposed within a cylinder 121 formed within the housing 10, the piston 121 dividing the cylinder into two chambers 122 and 123. Chamber 122 is connected by a passage 112 to port 107 of the sleeve 105, while chamber 123 is connected by passage 113 to the port 109. Ports 106 and 110 are connected to the drain passage 41, and port 108 is connected to the pressure supply passage 40.

Upon an increase in engine speed, as sensed by the speed sensing means including flyweights 24, 25 and the spring 32, the pilot valve plunger 30 will move upwardly, thereby effecting a corresponding upward movement of the piston 64, which, in turn, will impart clockwise angular movement to the actual speed shaft 75. Reset cam 78 will reposition the plunger 30 through the spring 32 to the neutral position when the force of spring 32 is exactly equal to the thrust of centrifugal force on the weights 24 and 25. Clockwise movement of the three-dimensional cam 86 will result in downward movement of the follower rod 94 whereby pilot valve plunger 100 will be moved upwardly so as to apply high pressure fluid to chamber 122, while chamber 123 is connected to drain. Accordingly, the piston 121 will move downwardly, thereby repositioning the plunger 100 in a neutral position and imparting clockwise movement to corrected speed shaft 130, or the second output member, through rack and pinion 124 and 125. The shaft 130 is rotatably supported by ball bearing assemblies 126 and 127 and extends into switch chamber 128, which is sealed from the hydraulic fluid at 129. The corrected speed shaft 130 has attached thereto corrected speed cams 131, 132, 133, and 134, which are operable to actuate microswitches 135, 136, 137 and 138, respectively. In addition, corrected speed shaft 130 extends without the housing 10 and is connected to an output lever 139.

The angular position of the corrected speed shaft 130 and its output lever 139 is a function of actual engine speed as modified by engine air temperature at the compressor. As stated hereinbefore, the inlet air temperature, as sensed by the thermostat 92 will control the diameter of the base circle of the three-dimensional cam 96. The devices actuated by the corrected speed shaft 130 constitute no part of this invention, and suffice it to say that these devices are in some way correlated with engine speed and air inlet temperature. Conversely, the devices actuated by the actual speed shaft 75 are only related to actual engine speed.

From the aforegoing, it is apparent that the present invention results in speed responsive mechanism for actuating an output member directly proportional to engine speed and a second output member proportional to engine speed as a function of ambient, or compressor inlet, air temperature. The schedule, or relationship, between actual engine speed and corrected engine speed is determined by the configuration of the three-dimensional cam.

While the embodiment of the present invention as herein disclosed, constitutes a preferred form, it is to be understood that other forms might be adopted.

What is claimed is as follows:

1. In a device of the character described, a rotatable input shaft, a displaceable member, centrifugally responsive means driven by said shaft and operatively connected to said member for moving it in one direction from a neutral position, resilient means acting in opposition to said centrifugally responsive means and operatively connected to said displaceable member for moving the said member in the opposite direction from the neutral position whereby when the oppositely acting forces imposed upon said displaceable member are in equilibrium, the said displaceable member will remain in said neutral position and when said oppositely acting forces are not in equilibrium, the said displaceable member will be moved away from the said neutral position, a first output element positioned by said displaceable member as a function of the actual speed of said input shaft, a second output element, actuating means including a three-dimensional cam carried by said first output element for controlling the position of said second output element, and means responsive to ambient temperature for modifying the operation of said actuating means whereby the second output element is positioned as a function of the actual speed of said input shaft modified by ambient temperature, the means responsive to ambient temperature including a thermostat operatively connected to said three-dimensional cam for varying the base circle thereof.

2. In a device of the character described, a rotatable input shaft, a first displaceable member, centrifugally responsive means driven by said shaft and operatively connected to said member for moving it in one direction from a neutral position, resilient means acting in opposition to said centrifugally responsive means and operatively connected to said first displaceable member for moving the said member in the opposite direction from the neutral position; a first output element, the position of which is controlled by the said first displaceable member as a function of the actual speed of said input shaft; a second displaceable member, a second output element, the position of which is controlled by said second displaceable member, and means for displacing said second displaceable member as a function of the actual speed of said input shaft modified by ambient temperature; said first and second displaceable members comprising pilot valves; first and second reversible servomotors connected respectively to said first and second output elements for positioning the same, each pilot valve controlling the actuation of its respective servomotor; said first and second output elements comprising first and second shafts operatively connected to and positioned by said first and second servomotors, respectively, said first shaft including cam means for repositioning said first pilot valve in response to movement of said first servomotor, and said first shaft including a second cam operatively connected to said second pilot valve for displacing the same.

3. In a device of the character described, a rotatable input shaft, a first displaceable member, centrifugally responsive means driven by said shaft and operatively connected to said member for moving it in one direction from a neutral position, resilient means acting in opposition to said centrifugally responsive means and operatively connected to said first displaceable member for moving the said member in the opposite direction from the neutral position; a first output element, the position of which is controlled by the said first displaceable member as a function of the actual speed of said input shaft; a second displaceable member, a second output element, the position of which is controlled by said second displaceable member; said first and second displaceable members comprising pilot valves; first and second reversible servomotors connected respectively to said first and second output elements for positioning the same, each pilot valve controlling the actuation of its respective servomotor; a three-dimensional cam angularly positioned by said first output member as a function of the actual speed of said input shaft cooperating with said second displaceable member, and means responsive to ambient temperature for adjusting the cam axially relative to said output member so as to vary the base circle thereof so that the second output element is positioned as a function of the actual speed of said input shaft as modified by ambient temperature.

4. A control device comprising, in combination, a rotatable input shaft, a displaceable servo control member, centrifugal means driven by the input shaft and connected to the servo control member to move the said member in one direction in response to rotation of the shaft, resilient means connected to said member and biasing it in the opposite direction, a servomotor, including a driven part, connected to and controlled by the said member, a speed output member connected to the driven part and connected to the resilient means to load the resilient means as a function of movement of the speed output member, means responsive to temperature, three-dimensional cam means coupled to the speed output member so as to be moved in one sense thereby and coupled to the temperature responsive means so as to be driven in another sense thereby, a cam follower cooperating with the cam means, a temperature-modified speed output member, and servomotor means coupling the cam follower to the temperature-modified speed output member to drive the temperature-modified speed output member in accordance with the movements of the cam follower.

References Cited in the file of this patent
UNITED STATES PATENTS

| | | |
|---|---|---|
| 1,353,656 | Heisler | Sept. 21, 1920 |
| 2,095,821 | Maas | Oct. 12, 1937 |
| 2,705,047 | Williams et al. | Mar. 29, 1955 |
| 2,727,357 | Hazen | Dec. 20, 1955 |
| 2,746,247 | Bevins | May 22, 1956 |